(No Model.) 2 Sheets—Sheet 1.

C. YOUNG.
COTTON HULLER AND CLEANER.

No. 432,921. Patented July 22, 1890.

Witnesses
Villette Anderson,
Philip C. Masi.

Inventor
Cornelius Young,
By his Attorney
E. W. Anderson.

(No Model.) 2 Sheets—Sheet 2.

C. YOUNG.
COTTON HULLER AND CLEANER.

No. 432,921. Patented July 22, 1890.

Witnesses
Villette Anderson,
Philip C. Masi.

Inventor
Cornelius Young
By his Attorney
E.W. Anderson.

THE NORRIS PETERS CO., PHOTO-LITHO., WASHINGTON, D. C.

UNITED STATES PATENT OFFICE.

CORNELIUS YOUNG, OF SELMA, ALABAMA.

COTTON HULLER AND CLEANER.

SPECIFICATION forming part of Letters Patent No. 432,921, dated July 22, 1890.

Application filed December 23, 1889. Serial No. 334,631. (No model.)

*To all whom it may concern:*

Be it known that I, CORNELIUS YOUNG, a citizen of the United States, and a resident of Selma, in the county of Dallas and State of Alabama, have invented certain new and useful Improvements in Cotton Hullers and Cleaners; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
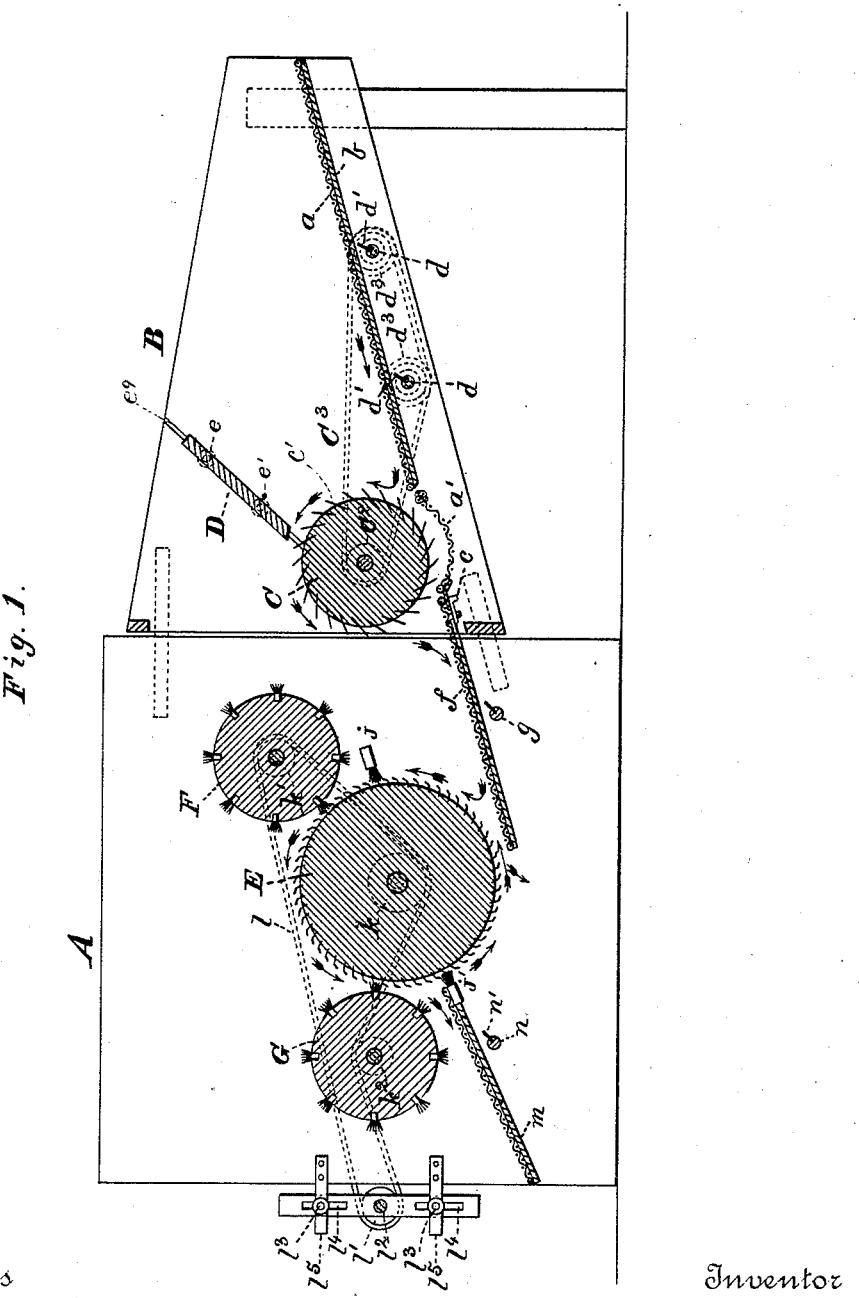
Figure 2:
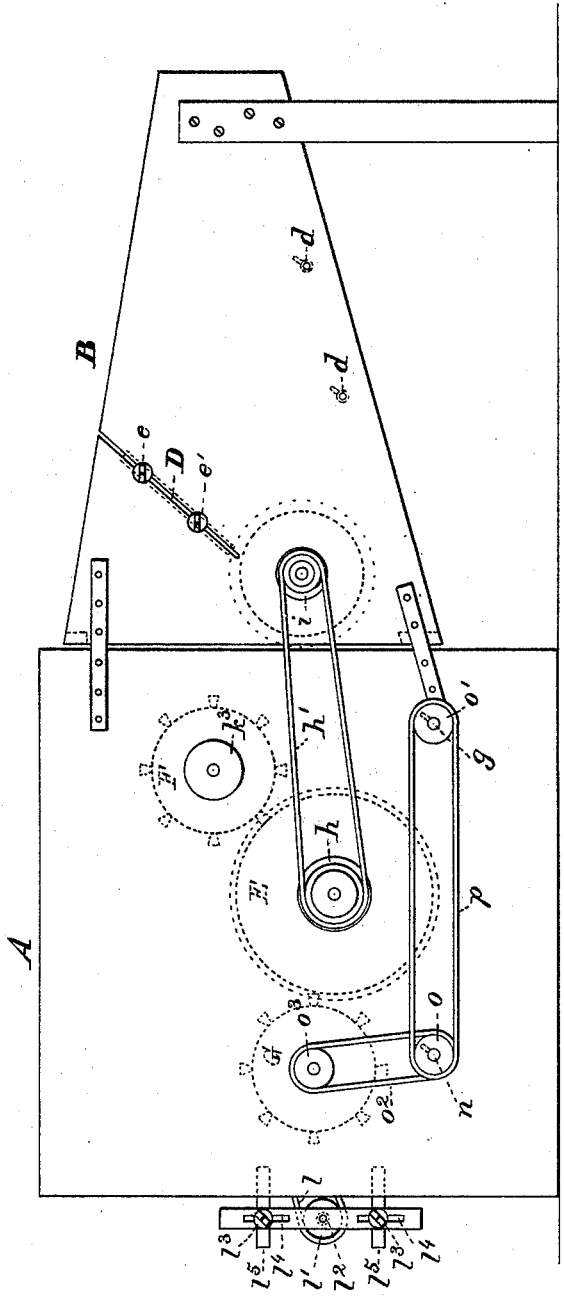

Figure 1 of the drawings is a vertical longitudinal section of my invention. Fig. 2 is a side view of the same.

This invention has for its object to clean cotton when gathered from the field either with the bolls or hulls on or when freed of the bolls or hulls, and to encourage gathering or picking cotton with the bolls or hulls on rather than picking it freed from hulls or bolls, as is now commonly practiced.

By the use of my machine cotton gathered with the bolls or hulls on can be made cleaner and freer from trash, leaves, dirt, &c., than is generally done by hand-picking, and much cheaper than by the latter method.

The invention consists of the novel combination and arrangement of parts, as will fully appear from the following description and accompanying illustration.

In carrying out my invention, I employ a suitable receptacle or closure A, which may be arranged adjacent to the breast of a cotton-gin, and connected to the front end of this receptacle or closure is a hopper or feeder B. The hopper or feeder B is preferably tapering toward its outer end, and has in its bottom a screen or sieve $a$ inclined toward the closure or receptacle A, and having a longitudinal central strip $b$, the purpose of which will appear farther on. At the lower edge of the sieve or screen $a$ is a hinged or pivoted concave screen $a'$, the free or inner edge of which may be secured by a button or latch $c$. This screen $a'$ has for its object to permit the accumulation therein of hard foreign substances—such as nails, sticks, &c.—and the ready removal or disposition of the contents thereof at such times as necessary by opening the said section and freeing it of its said contents. Under the inclined screen or sieve $a$ are arranged two shafts $d$, hung at suitable intervals apart in the sides of the feeder or hopper B. These shafts are each provided with a projection or stud $d'$, which, as the shaft revolves, acts upon or strikes the strip $b$ of the sieve or screen $a$ to jar the sieve or screen in order to expedite the passage over it of the cotton and free the latter of dirt. Each shaft $d$ has on one end a stepped pulley $d^3$, of three (more or less) faces or diameters, to vary the speed or revolution of the shafts, according to the amount of agitation or jar it may be desired to impart to the screen or sieve.

C is a cylinder, which is hung in the feeder or hopper B, and armed throughout its periphery with spikes or teeth $c'$ to act upon the cotton in its bolls or hulls and carry it over and throw it on a second screen described farther on. The shaft of the cylinder C has on one end a stepped pulley $C^2$, around which and the pulleys $d^3$ is passed an endless belt $C^3$ to transmit motion to the latter.

Above the cylinder C, and adjustable in the sides of the feeder or hopper B, preferably as shown by bolt $e$ and set-screws $e'$, the bolts passing through slots in the sides, is an inclined gage-board D, between the lower edge of which and the cylinder C is carried or passed the cotton taken up by the teeth of the said cylinder. The adjustability of the gage-board D limits the amount of cotton passed at any one time or revolution of the cylinder over into the closure or receptacle A. In the lower part of the receptacle or closure A is a screen or sieve $f$, of a corresponding inclination with the sieve or screen $a$, and upon which the cotton falls from the cylinder C. Underneath the sieve or screen $f$ is also arranged a shaft $g$, hung in the sides of the closure or receptacle A, and having a projection or stud $g'$ to similarly affect the said sieve or screen $f$ as the sieve $a$ is affected by the studs or projections on the shaft $d$ and for the same purpose.

E is a large cylinder whose shaft is journaled in the sides of closure A, and which is armed with card-clothing or otherwise suitably adapted to take up the cotton fed to it by the sieve or screen $f$, the latter having its lower edge standing contiguously to said cylinder, the required space, however, being left between said cylinder and sieve for the escape or discharge of hulls, trash, or dirt. The shaft of the cylinder E is provided on one end with a stepped pulley $h$, whose belt $h'$ also encompasses a stepped pulley $i$ on one end of the shaft of the cylinder C, each of which pulleys has a series of faces of different diameters to vary the speed or rotation of the said cylinders as may be required.

$j\,j'$ are about opposite cards held to the inner surfaces of the sides of the closure or receptacle A, and having their teeth nearly touching the card-clothing of the cylinder E. The card $j$ presses the cotton upon the card-clothing of the cylinder E, while the card $j'$ subjects any cotton that may adhere to said cylinder when reaching said card to a further carding action, said adhering cotton continuing on around with said cylinder to receive further like treatment. F and G are rotary cylindrical brushes hung in the sides of the closure or receptacle A, and arranged one about opposite the upper front portion of the cylinder E and the other about opposite the rear face of said cylinder.

The brush F removes hulls or bolls, leaves, and dirt from the cotton, while the brush G merely removes the cotton from the cylinder E and throws it upon the screen below.

The shafts of the cylinder E and brushes F and G are provided with pulleys $k$ $k'$ $k^2$, respectively, which are encompassed by a common belt $l$, which also passes around an idler-pulley $l'$, whose bearing $l^2$ is adjustably supported in position by set-screws $l^3$, engaging slots $l^4$ in said bearing and working in brackets $l^5$, secured to the closure A. The cylinder E and brushes F and G are thus put in motion, the opposite end of the shaft of the brush F having also a pulley $k^3$, which is designed to be belted to a pulley of the gin. The idler-pulley $l'$ permits tightening the belt $l$ of the cylinder E and brushes F and G. Extending from the card $j'$ downward to the rear end of the closure A is also an inclined sieve or screen $m$, which conducts or conveys the cotton after the final carding and cleaning processes to the gin. Beneath the sieve or screen $m$ is also hung in the sides of closure A a shaft $n$, which carries a projection or stud $n'$ to vibrate or jar said screen or sieve to expedite the discharge or passage of the cotton from the closure A into the gin. Each of the sieves or screens $f$ and $m$, it will be understood, is, in like manner as sieve or screen $a$, provided with a central longitudinal strip, which receives the action of the studs or projections on the shafts $n$ and $g$, and these shafts are provided with pulleys $o\ o'$, respectively, which are encompassed and driven by an endless belt $p$, the pulley $o$ receiving motion through a second endless belt $o^2$, driven by a pulley $o^3$ on the shaft of the brush G.

Having described my invention, what I claim as new, and desire to secure by Letters Patent, is—

1. The combination of the toothed cylinder, the feeder or hopper, the inclined sieve or screen, and the concave hinged or pivoted sieve or screen section arranged under said cylinder, substantially as specified.

2. The combination of the closure or receptacle, the inclined sieves or screens, the card-clothing-armed cylinder arranged between said sieves or screens, the cards at opposite sides of said cylinder, the rotary brushes arranged with relation to said cylinder, as described, and means for transmitting motion to said cylinder and brushes, substantially as specified.

3. The combination of the feeder or hopper, its inclined sieve or screen and toothed cylinder, the closure or receptacle having sieves or screens, one in alignment with the sieve or screen of said feeder, the card-clothing-armed cylinder, the rotary brushes, and the cards arranged in said closure, said cards being disposed upon opposite sides of said latter cylinder, and said brushes being arranged with relation to the same cylinder, as described, the shafts having studs or projections to actuate said sieves or screens, and means for transmitting motion to said shafts, cylinder, and brushes, substantially as set forth.

In testimony whereof I affix my signature in presence of two witnesses.

CORNELIUS YOUNG.

Witnesses:
T. W. ROBINSON,
ROBT. W. YOUNG.